Oct. 28, 1958
W. E. BRADLEY
2,858,364
CATHODE RAY TUBE SYSTEMS
Filed May 12, 1953
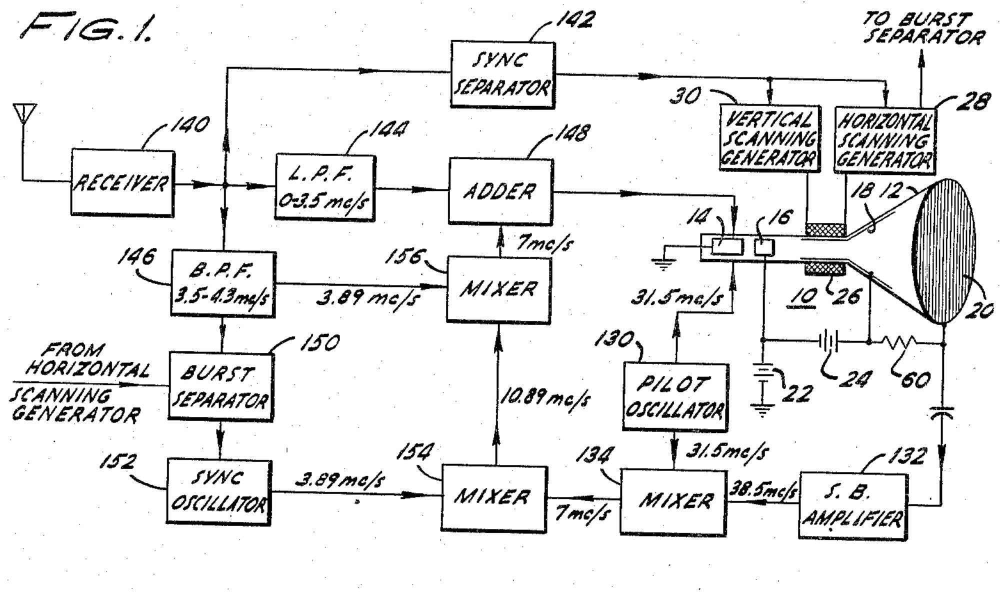
FIG. 1.
FIG. 2.
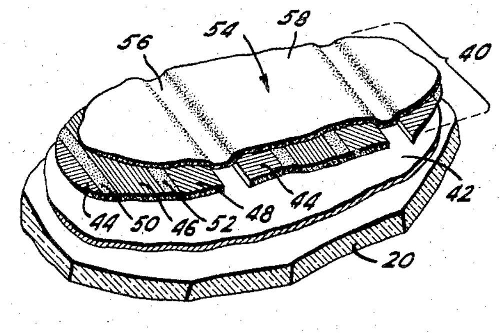
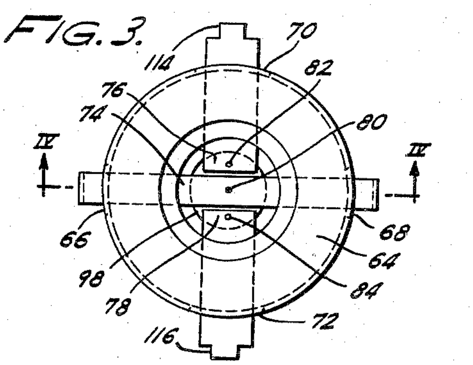
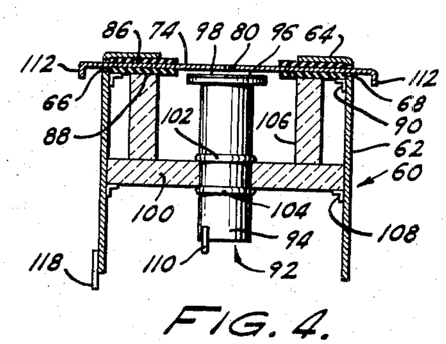
FIG. 4.
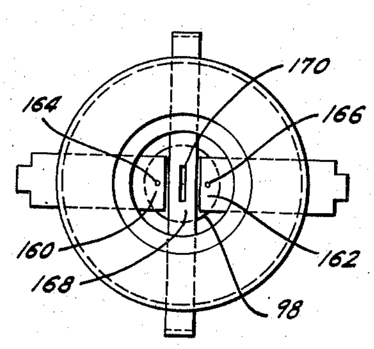
FIG. 5.
INVENTOR.
WILLIAM E. BRADLEY
BY
Dean V. Hazeltine
ATTORNEY 2,858,364
Patented Oct. 28, 1958

1

2,858,364

CATHODE RAY TUBE SYSTEMS

William E. Bradley, New Hope, Pa., assignor to Philco Corporation, Philadelphia, Pa., a corporation of Pennsylvania Application May 12, 1953, Serial No. 354,588

16 Claims. (Cl. 178—5.4)

The present invention relates to electrical systems and more particularly to cathode-ray tube systems comprising a beam intercepting structure and indexing means arranged in cooperative relationship with the beam intercepting structure and adapted to produce a signal indicative of the position of the cathode-ray beam.

The invention is particularly adapted for, and will be described in connection with, a color television image presentation system utilizing a single cathode-ray tube having a beam intercepting, image forming screen member comprising vertical stripes of luminescent materials. These stripes are preferably arranged in laterally displaced color triplets, each triplet comprising three vertical phosphor stripes which respond to electron impingement to produce light of the different primary colors. The order of arrangement of the stripes may be such that the normal horizontally scanning cathode-ray beam produces red, green and blue light successively. From a color television receiver there may then be supplied a video signal wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by an appropriate camera system adapted to produce three signals indicative of three color-specifying parameters of the successively scanned elements of a televised scene. In accordance with present practice, the signals are combined to produce a color video wave which comprises a first component having a relatively wide bandwidth and defining the brightness of the consecutively scanned image elements, and a second component in the form of a modulated subcarrier arranged at one end of the frequency spectrum of the first component and defining, with the first component, the chromaticity of the image elements. As a rule, this subcarrier component is made up of two carrier signals of the same frequency and in phase quadrature, which signals are individually amplitude modulated by two color difference signals derived from the generated camera signals. One of these difference signals may be constructed to represent changes of the chromaticity of the image elements along one axis, i. e. the orange-cyan axis of the chromaticity diagram, and the other difference signal may be constructed to represent changes of the chromaticity of the image elements along a complementary axis, i. e. the magenta-green axis, of the chromaticity diagram.

In a typical case, the first component of the color video wave may have a frequency spectrum extending from 0 to 3.5 mc./sec. and the color subcarrier component may have a frequency of approximately 3.89 mc./sec.

The instantaneous amplitude of the video signal will be a function of the magnitude of the three components thereof and of the absolute phase positions of the two components constituting the modulated subcarrier signal, and at any given instant the amplitude is indicative of the intensity of one of the primary color constituents of an element of the image to be reproduced. For proper color rendition, it is required that, as the phosphor stripe producing a given one of the primary colors of light of a particular image element is impinged by the cathode-ray beam, the intensity of the beam be simultaneously controlled in response to the contemporaneous value of the video signal representing the corresponding color component of the televised image. Such a synchronous relationship may be maintained throughout the scanning cycle by deriving an indexing signal indicative of the instantaneous position of the cathode-ray beam upon the image forming screen, and by utilizing the signal to control the relationship between the phase of the video wave and the position of the beam. This may be achieved by varying the time phase position of the video wave and/or by varying the scanning rate of the beam as determined by variations of the indexing signal.

The indexing signal may be derived from a plurality of beam responsive signal generating regions of the beam intercepting screen structure. These regions may be arranged in a geometric configuration indicative of the geometric configuration of the phosphor strips so that, when the beam scans the screen, the indexing regions are excited in spaced time sequence relative to the scanning of the color triplets and the desired indexing signal is generated in a suitable output electrode system of the cathode-ray tube. In one form the indexing regions may be constituted by a layer of a material adapted to exhibit secondary electron emissive properties at specified striped portions thereof different from the secondary emissive properties at other portions thereof. Such differences in secondary electron emissivities may be attained by an underlying layer exhibiting at the corresponding portions different values of resistance to electron flow as disclosed and claimed in the copending application of William E. Bradley and Meier Sadowsky, Serial No. 313,018, filed October 3, 1952, now Patent No. 2,768,318, issued October 23, 1956.

In the copending application of M. E. Partin, Serial No. 242,264, filed August 17, 1951, now Patent No. 2,742,531, issued April 17, 1956, there has been described a cathode-ray tube system in which the phosphor stripes constituting the image screen and the indexing regions thereof are simultaneously scanned by two electron beams which move in synchronism across the surface of the image screen. One of the electron beams serves to energize the phosphor stripes, and for this purpose the beam is intensity modulated by the color video wave. The second beam serves to produce indexing information indicative of the position of the first beam and the beam is intensity modulated at a pilot carrier rate in accordance with the principles set forth in the copending application of E. M. Creamer, Jr., et al., Serial No. 240,324, filed August 4, 1951, now Patent No. 2,667,534, issued January 26, 1954. The so modulated second beam produces, at an output electrode system of the cathode-ray tube, signal components which represent modulation products as determined by the intensity variations of the second beam and the rate of scanning the indexing regions. When the intensity of the second beam is modulated at a pilot carrier rate which is widely different from the rate at which the first beam is varied by the video wave, the indexing information produced by the second beam may be derived substantially free of contaminating components normally produced by the presence of video modulation within the cathode-ray tube system. The pilot carrier modulation products so produced consist essentially of a carrier wave at the pilot carrier frequency and sideband signals representing the sum and difference of the pilot carrier frequency and the rate of scanning the indexing regions. Since changes in the rate of scanning the indexing regions will be indicated by a change in the frequencies of the sideband signals, one of those sideband signals may be used as an indexing signal. In order to maintain a fixed position relationship between the beams during the scanning interval thereby insuring that the indexing information produced by the second beam is at all times indicative of the position of the other beam, it is necessary that both beams be identically influenced by the focusing and deflection system through which they pass and that the confronting surface of the image screen present the same angular orientation to both beams throughout the scanning area. These requirements may be readily fulfilled when the image screen is relatively small, in which case the paths of the beams remain within the central portions of the focusing and deflection fields which may be made uniform relatively inexpensively, and the screen surface is substantially concentric to the center of deflection of the beams. However, when large size image screens are contemplated, it is no longer feasible to restrict the beams to the central portions of the focusing and deflecting fields because of the greater scanning deflection angle required so that, in the absence of a relatively expensive focusing and deflection system, the beams will pass through non-uniform fields while scanning the boundary portions of the image screen.

Under these conditions it is found that the beams rotate relative to each other during the horizontal scanning period to the extent that whereas the beams may lie in a vertical plane when impinging the center of the screen structure, one beam may lead the other at one edge of the screen and may lag the other at the other edge of the screen. This undesirable change of the relative positions of the beams is further aggravated by the fact that the screen surface is no longer concentric to the effective center of deflection of the beams but may be aspherical thereto to the extent that the angle of impingement of the beams at the center of the screen surface markedly differs from the angle of impingement by the beams at the edge portions of the screen surface.

This change in the relative positions of the beams during the scanning interval is equivalent to a phase displacement of the indexing information relative to the color image information and may seriously affect the color of the reproduced image at its non-central portions.

It is an object of the invention to provide improved cathode-ray tube systems of the type in which the position of an electron beam on a beam intercepting screen structure is indicated by an indexing signal derived from an indexing component of the screen structure.

Another object of the invention is to provide improved cathode-ray tube systems in which undesired phase variations of the indexing information produced by an indexing screen structure are avoided.

Another object of the invention is to provide improved cathode-ray tube systems embodying means for producing a plurality of beams, one of which is employed to effect the reproduction of a color television image, and the position of which may be accurately established, notwithstanding non-uniformities of the focusing and deflecting fields to which the beams may be subjected and notwithstanding the fact that the image screen surface departs radically from concentricity to the center of deflection of the beams.

Further objects of the invention will appear as the specification progresses.

In accordance with the invention, in a cathode-ray tube system adapted to generate indexing information indicative of the position of a color image producing cathode-ray beam, the foregoing objects are achieved by means of a plurality of beams, the action of which is combined to produce the desired index information. These indexing beams are symmetrically arranged with respect to the image producing beam so that, when one indexing beam advances in position relative to the image beam, a second beam is correspondingly retarded in its position relative to the image beam. Since the desired indexing information is produced by the combined action of the indexing beams, it will exhibit a constant phase relationship to the position of the image beam notwithstanding rotations of the indexing beams brought about by non-uniform focusing and deflection fields or variations of the distance between the impingement points of the image and indexing beams brought about by the geometry of the screen surface.

In one specific form of the invention, the cathode-ray image reproducer comprises means for generating an image reproducing beam and two indexing beams arranged on opposite sides of the image beam in a common vertical plane so that, as the beams scan the edge and corner portions of the image screen, the angular rotational and/or positional displacement of one of the indexing beams from the initial vertical plane of the beams is accompanied by a compensating rotational and/or positional displacement of the other of the indexing beams which maintains the resultant indexing information produced by the two indexing beams at a constant phase relative to the position of the image beam.

In a second specific form of the invention the indexing beams are arranged on opposite sides of the image beam in a common horizontal plane to produce the above described compensating action.

The invention will be described in greater detail with reference to the appended drawing forming part of the application and in which:

Figure 1 is a block diagram partly schematic showing one form of a cathode-ray tube system embodying the invention;

Figure 2 is a perspective view of a part of one form of an image reproducing screen structure for the cathode-ray tube system of Figure 1;

Figure 3 is a plan view of one form of a multiple beam generating and intensity control assembly in accordance with the invention;

Figure 4 is a cross-sectional view of the assembly of Figure 3 taken along the line IV—IV; and Figure 5 is a plan view of another form of a multiple beam generating and intensity control assembly in accordance with the invention.

Referring to Figure 1, a color television receiving system there shown, comprises a cathode-ray tube 10 containing, within an evacuated envelope 12, an electrode system 14, later to be described more fully, and adapted to generate an image beam and two indexing beams and to control the intensities thereof. Also contained within the envelope 12 is a focusing anode 16 and an accelerating anode 18, the latter of which may consist of a conductive coating on the inner wall of the envelope which terminates at a point spaced from the end face 20 of the tube 10 in conformity with well established practice. Electrodes 16 and 18 are maintained at their desired operating potentials by suitable voltage sources shown as batteries 22 and 24, the battery 22 having its positive pole connected to the anode 16 and its negative pole connected to a point at ground potential, and the battery 24 being connected with its positive pole to electrode 18 and its negative pole to the positive pole of battery 22.

A deflection yoke 26 coupled to horizontal and vertical scanning generators 28 and 30 respectively, of conventional design, is provided for deflecting the multiple electron beams across the faceplate 20 to form a raster thereon.

The faceplate 20 of the tube 10 is provided with an image forming screen structure, one suitable form of which is shown as 40 in Figure 2.

The structure 40 comprises a light transparent, electrically conductive coating 42 which may be a coating of stannic oxide or of a metal such as silver, having a thickness only sufficient to achieve the desired conductivity. Superimposed on the coating 42 are a plurality of parallelly arranged stripes 44, 46 and 48 of phosphor materials which, upon electron impingement, fluoresce to produce light of three different primary colors. For example, the stripe 44 may consist of a phosphor such as zinc phosphate containing manganese as an activator, which upon electron impingement produces red light; the stripe 46 may consist of a phosphor such as zinc orthosilicate, which produces green light; and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the faceplate 20, and further details herein concerning the same are believed to be unnecessary.

Each of the groups of stripes may be termed a color triplet, and the sequence of the stripes is repeated in consecutive order over the area of the structure 40.

The structure 40 further serves for producing an indexing signal indicative of the position of the image producing beam on the image screen and for this purpose the structure 40 may be of the form described and claimed in the above referred copending application of William E. Bradley and Meier Sadowsky. More particularly, and in accordance with one arrangement described in said application, the phosphor stripes 44, 46 and 48 are arranged in spaced relationship as shown in Figure 2 and the spaces between stripes 44—46 and between stripes 46—48 are filled with an electrically insulating material such as unactivated willemite, the said stripes so formed being shown as 50 and 52 respectively. Arranged over the stripes 44, 46, 48, 50 and 52, and in contact with the coating 42 at the space between stripes 44—48, is a coating 54 of a material adapted to exhibit different secondary emissive properties as determined by the resistance to electron flow of the underlying layer. Such a material may be magnesium oxide, which, in the construction shown, exhibits, at its portion 56 in contact with the conductive layer 42, a secondary electron emissivity different from that exhibited by its portions 58 overlying the stripes 46, 48, 50 and 52.

The beam intercepting structure so constituted is connected to the positive pole of battery 24 through a load impedance 60 (see Figure 1) by means of a suitable connection to the conductive coating 42 thereof.

The multiple beam generating system 14 may take a variety of forms. A particularly effective construction is a modification of the electrode system described and claimed in the copending application of Wade L. Fite and Albert D. Rittmann, Serial No. 307,868, filed September 4, 1952, which modified system is shown in Figures 3 and 4. As shown, the beam generating system comprises a cylindrical member 60 having a tubular body portion 62 extending into an annular end portion 64. The portion 64 is preferably formed as an integral portion of the body portion 62, for example by extrusion. Portions 62 and 64 may consist of nickel, stainless steel or of other suitable material commonly used in the manufacture of gun assemblies for cathode-ray tubes. At the junction of the body and end portions 62 and 64, the tubular portion 62 is provided with peripheral slots 66, 68, 70 and 72.

Within the sleeve 60 are three control electrodes 74, 76 and 78. Electrode 74 is in the form of a strip element which extends along a diameter of the sleeve 60 with its ends extending through the peripheral slots 66 and 68, and is provided with an aperture 80. Electrodes 76 and 78 are each in the form of a spade element extending through the peripheral slots 70 and 72 respectively and toward the central axis of the sleeve 60. At their inner portions the electrodes 76 and 78 confront opposite sides of the electrode 74 and are each provided with an aperture 82 and 84 respectively, these latter apertures being arranged symmetrically with respect to the aperture 80, so that the beams issuing from the apertures 82 and 84 are symmetrically positioned with respect to the beam issuing from the aperture 80. While the three apertures, as shown, have the same dimensions, the aperture 80, through which the image producing beam issues, may be made larger than the apertures 82 and 84, so as to permit a greater beam current for the image beam.

Electrodes 74, 76 and 78 are rigidly supported in an electrically insulated manner within the sleeve 60 by means of electrically insulating washers 86 and 88 and by means of a flanged metal ring 90 which may be welded to the inner surface of the sleeve 60. As will be noted, washer 86 is interposed between the electrodes and the inner surface of the annular end portion 64, whereas the washer 88 is arranged between the said electrodes and the ring 90. By adjusting the compression exerted by the ring 90 against the washer 88, the control electrodes may be securely positioned within the sleeve 60. The adjustment by the ring 90 is preferably effected after precisely aligning the electrodes so that the apertures thereof are arranged along a common diameter and the ends of electrodes 76 and 78 are uniformly spaced from the abutting edges of electrodes 74 by a distance of the order of .002″, which has been found to be sufficiently small to establish an electrostatic field such as to prevent electrons from passing through the gaps under normal operating conditions of the cathode-ray tube.

In practice, the insulating washers 86 and 88 consist of mica. However, it will be apparent that other suitable stable insulating material, such as ceramic materials, may be used.

Also positioned within the sleeve 60 is a cathode assembly 92 which may consist of a nickel or stainless steel sleeve 94 open at the bottom end thereof and closed at the top end thereof by a nickel cap 96 to provide a suitable base for an electron emissive coating 98. Coating 98 may be of conventional composition and may consist, for example, of a mixture of barium and strontium oxides.

The cathode assembly 92 is secured within the sleeve 60 by means of an apertured ceramic disc 100 of steatite, lavite or the like to which the assembly 92 is affixed by beadings 102 and 104 formed on the periphery of the sleeve 94. For locating the disc 100 within the sleeve 60 there are provided an annular spacer 106, consisting of an insulating material—for example a ceramic such as steatite, lavite or the like—one end of which abuts the exposed surface of mica washer 88 and the other end of which abuts the top surface of the disc 100, and a metal flanged ring 108 which abuts the lower surface of the disc 100 and is welded or otherwise secured to the inner surface of the sleeve 60.

In order to position the electrodes 74, 76 and 78 in a common plane and at a fixed predetermined distance from the surface of the electron emitting coating 98, insulating washers 86 and 88 are formed with substantially flat parallel surfaces, and the spacing determining elements are formed to precisely controlled dimensions. This may be most simply effected by the use of mica for the washers 86 and 88 as above pointed out, since this material splits with substantially parallel surfaces and can be accurately controlled as to its thickness, and by grinding the active surfaces of the spacer 106 and the disc 100.

A suitable electrical heater (not shown) of well known form may be enclosed within the cathode sleeve 94 to maintain the emissive coating 98 and its electron emitting temperature.

Electrical connection to the cathode sleeve 94 may be provided by a tab 110, whereas individual electrical connections to the electrodes 74, 76 and 78 may be provided by tap extension portions 112, 114 and 116 respectively of these electrodes. The sleeve 60 may be operated at cathode potential, and for this purpose it may be provided with a tab connection 118.

As above pointed out, the beams emanating from the apertures 82 and 84 are symmetrically positioned with respect to the beam emanating from the aperture 80 of control electrode 74. Therefore, when the beams are rotated relative to each other by the non-uniform field produced by the focusing and deflection fields so that the beam emanating from the aperture 82 leads the beam emanating from the aperture 80, the beam emanating from aperture 84 will correspondingly lag the beam from aperture 80. Furthermore, when the image screen has a surface which is non-spherical about the effective center of origin of the beams in the deflection system, so that the beam from aperture 82 leads the beam from aperture 80 by a progressively greater amount as the beams approach the edge portions of the image screen, the beam from aperture 84 will lag the beam from aperture 80 by a corresponding amount.

Accordingly, by utilizing the beams derived from apertures 82 and 84 in combination to derive from the screen structure 40 the desired index information indicative of the position of the beam from aperture 80, a phase change of the indexing information normally due to the change in the relative position of the beams from apertures 80 and 82 will be cancelled by a compensating phase change of the information due to a compensating change in the relative position of the beams from apertures 80 and 84.

The indexing beams emanating from apertures 82 and 84 may be made to generate the desired phase invariant indexing information in any of several manners. Preferably this information is generated in accordance with the principles set forth in the above mentioned Partin application. To adapt the teachings of that application to the present invention, the beams from apertures 82 and 84 are simultaneously varied in intensity, for example by means of a signal from a pilot oscillator 130 (see Figure 1) which is connected to both of the electrodes 76 and 78 in the same phase. The so varied beams will generate, across the load resistor 60, two indexing signal components, each comprising a carrier portion at the pilot frequency and sideband portions representing the sum and difference frequencies of the pilot frequency and the rate at which the indexing stripes are scanned by the beams.

In a typical case, the pilot frequency variations of the intensities of the indexing beams may occur at a nominal frequency of 31.5 mc./sec., and, when the rate of scanning the indexing stripe regions 56 of the beam intercepting structure 40 (see Figure 2) is nominally 7 million per second as determined by the horizontal scanning rate and the number of indexing regions impinged per scanning period, two modulated signal components, each comprising a carrier at 31.5 mc./sec. and sidebands at 24.5 mc./sec. and 38.5 mc./sec., are produced across load resistor 60. Changes in the rate of scanning the indexing regions due to non-linearities of the beam deflection and/or non-uniformities of the spacing of the indexing regions produce corresponding changes in the frequencies of the sidebands with respect to the frequency of the carrier, i. e. the sidebands undergo frequency deviations proportional to the variations of the rate of scanning the indexing signal.

When the indexing beams impinge simultaneously on the same indexing region 56, which occurs when the beams are arranged in a common vertical plane as shown in Figure 3 and when there is no rotation of the beams, the two indexing signal components generated will have the same time phase relationship and will produce, across the load resistor 60, a resultant indexing signal of the same phase and an enhanced amplitude. When the beams do not simultaneously impinge on the same indexing regions because the beams do not emanate in a plane parallel to the planes of the indexing regions 56, the two indexing signal components generated will be phase-displaced relative to each other. However, the amount by which the phase of the indexing signal component generated by one beam is advanced, relative to the time phase position of the image beam, will be substantially compensated by a corresponding retardation of the phase of the indexing signal component generated by the other beam, so that, when the two indexing components are added by the common load impedance 60, a resultant indexing signal is produced having an invariant time phase position which is equal to the average of the time phase positions of the components—i. e. having a time phase position which is invariant with respect to that of the image beam. Similarly, when the impingement points of the indexing beams on the screen are shifted relative to each other and relative to the impingement point of the image beam because the beams are rotated by a non-uniform focusing and deflection field and/or because of the non-spherical geometry of the tube face, the phase-advanced indexing information produced by one indexing beam will be corrected by the phase-retarded indexing information produced by the other indexing beam so that the resultant indexing information produced will be phase invariant.

The phase invariant resultant indexing signal so produced may be used to control either or both the time phase position of the color video wave supplied to the image reproducing tube or the deflection velocity of the scanning system so as to maintain a synchronous relationship between the color information supplied by the color video wave and the position of the image producing beam of the image reproducer.

In the arrangement specifically shown in Figure 1, this synchronous relationship is achieved by controlling the phase of the color video wave supplied to the image reproducer and by utilizing as the controlling signal the indexing information contained in the upper sideband of the resultant indexing signal produced across load resistor 60. This sideband may be preferentially selected from the remaining signal components generated across load impedance 60 by means of a sideband amplifier 132 having a restricted bandpass characteristic centered about this nominal frequency value. Amplifier 132 may be of conventional form and may be made to exhibit a restricted bandpass characteristic in any well known manner, for example by means of a resonant circuit broadly tuned to the nominal frequency of the desired sideband or by an equivalent filter system.

By synchronously detecting the output of amplifier 132 by means of a heterodyne mixer 134, to which is also supplied a signal from the pilot oscillator 130, there is produced an output signal having a nominal frequency of 7 mc./sec. and having frequency variations as determined by variations of the rate of scanning the indexing regions of the image screen structure. This output signal may be used for controlling the time phase position of color image information supplied to the tube 10 as will be more fully pointed out later. Mixer 134 may be of conventional form and may consist of a dual grid thermionic tube, to the different grids of which the two input signals are supplied, and may further comprise an output circuit broadly tuned to the frequency of the desired heterodyne frequency signal, nominally at the frequency of 7 mc./sec.

For supplying a color video wave to the tube 10, the system shown in Figure 1 comprises a receiver 140 which may be of conventional design and include the usual radio frequency amplifier, frequency conversion and detector stages for deriving the color video signal produced at the transmitter.

In a typical form, the received color video signal comprises time-spaced horizontal and vertical synchronizing pulses which recur at the horizontal and vertical scanning frequencies, and the color video wave which occurs in the intervals between the horizontal pulses. The incoming video signal may further include a marker signal for providing a phase reference for the color establishing component of the color video wave, such a marker being usually in the form of a burst of a small number of cycles of carrier signal having a frequency equal to the frequency equal to the frequency of the chromaticity subcarrier of the video wave and occurring during the so-called back porch interval of the horizontal scanning pulses.

The synchronizing pulses contained in the received video signal are selected by a sync signal separator 142 of conventional form, and subsequently energize, in well known manner, the horizontal and vertical scanning generators 28 and 30.

The video color wave, which may be generated at the transmitter in the manner previously described, is separated into its two components by means of a low pass filter 144 and a bandpass filter 146 whereby, at the output of filter 144, there is derived the low frequency component of the video wave containing the brightness information of the image, and, at the output of the filter 146, there is derived the modulated subcarrier component of the video wave indicative of the chromaticity information of the image and the marker signal. The frequency pass bands of the filters 144 and 146 are selected in conformity with the standards of the transmission system, typical values for the pass bands of filters 144 and 146 being 0 to 3.5 mc./sec. for filter 144 and 3.5 to 4.3 mc./sec. for filter 146 when a subcarrier frequency of approximately 3.89 mc./sec. is used at the transmitter.

The output signal of filter 144 is supplied to electrode 74 (see Figure 3), to control the intensity of the image producing beam of the tube 10, through an adder 148 having a plurality of inputs and a common output and consisting, in a typical case, of a plurality of thermionic tubes, the input grid circuits of which are separately energized by the respective input signals applied to the adder and the output anode circuits of which are supplied through a common load impedance.

The marker signal is separated from the video wave by means of a gated path operated in synchronism with the occurrence of the marker signal. For this purpose there is provided a burst separator 150 consisting, for example, of a dual grid thermionic tube having one control grid which is coupled to the output of the bandpass filter 146 and a second control grid so negatively biased as normally to prevent conduction through the tube. The tube is made conductive at the proper instant, i. e. during the back porch interval of the horizontal synchronizing pulses, by means of a positive pulse which may be derived from the output of the horizontal scanning generator 28 in well known manner and which is applied to the said second control grid to override the normal blocking bias. The burst separator may also contain a filter for attenuating undesirable signals at the output thereof, i. e. the separator may contain a resonant circuit which is tuned to the frequency of the marker signal and which is connected to the anode of the tube. Alternatively, the burst separator may be of the form described and claimed in the copending application of Clem H. Phillips, Serial No. 345,307, filed March 30, 1953.

The marker signal so provided is applied to an oscillator 152 which is adapted to generate a signal having a frequency and a phase position as established by the frequency and phase position of the marker signal applied to the input thereof. In a suitable form the oscillator 152 may be of the type described in the copending application of Joseph C. Tellier, Serial No. 197,551, filed November 25, 1950 now Patent No. 2,740,046, issued Mar. 27, 1956.

The chromaticity information, contained on the 3.89 mc./sec. subcarrier component of the received color video wave, is supplied to the electrode 74 of the tube 10 at a frequency of 7 mc./sec. and in proper phase as determined by the marker signal derived from the oscillator 152 and by the indexing information derived from the mixer 134 by means of a heterodyne mixer 154 and by means of a second mixer 156. Mixer 154 has one input supplied by the oscillator 152 and a second input supplied by the mixer 134. Mixer 156 has one input circuit supplied by the bandpass filter 146, has a second input circuit supplied by the mixer 154 and has an output circuit coupled to an input circuit of the adder 148. The heterodyne mixers 154 and 156 may be of conventional form and may each consist of a dual grid thermionic tube, to the different grids of which the two input signals are supplied. The mixers may also include an output circuit broadly tuned to the frequency of the desired output signal, whereby the desired heterodyne frequency signal may be preferentially selected.

The system operates to combine the marker reference signal at 3.89 mc./sec. with the indexing signal at a nominal frequency of 7 mc./sec. to produce a first heterodyne signal at a frequency of approximately 10.89 mc./sec. This heterodyne signal, it will be noted, exhibits, about a fixed phase reference established by the marker reference signal, the frequency variations determined by variations of the rate of scanning of the indexing regions of the beam intercepting screen of the tube 10.

By means of a mixer 156 this heterodyne signal is in turn combined with the chromaticity information at 3.89 mc./sec. derived from the bandpass filter 146 to produce a second heterodyne signal at 7 mc./sec., which signal exhibits the phase and amplitude variations of the chromaticity signal and the frequency variations established by the variations of the scanning rate of the indexing regions, and hence of the color triplets of the screen, these variations being established with reference to a given time phase position as determined by the color marker signal energizing the oscillator 152.

In the specific form of the multiple beam generating assembly shown in Figures 3 and 4, the beams emanate from the beam generating system in a common vertical plane so that, if the beams are not rotated in the subsequent focusing and deflection thereof, they simultaneously impinge on the same vertically arranged indexing regions of the image reproducer. It is apparent, however, that, in view of the phase compensating action brought about in accordance with the invention, it is not necessary to align the gun structure so that the beams emanate therefrom in a vertical plane. More particularly, and as shown in Figure 5, the index information producing beams may emanate from the gun structure in a plane which is at an angle to the plane of the indexing regions of the image screen.

The multiple beam assembly shown in Figure 5 comprises two control electrodes 160 and 162 in the form of spade elements with their confronting edges spaced apart. Electrodes 160 and 162 are provided with apertures 164 and 166 respectively, through which pass the beams to be intensity controlled thereby. Arranged between the electrodes 160 and 162 is a third beam intensity control electrode 164 which is similar in construction to the electrode 74 of Figures 3 and 4 and which serves to control the intensity of the image producing beam of the assembly. Electrode 168 is provided with a rectangular aperture, the major axis of which is parallel to the longitudinal axis of the phosphor stripes of the image screen. The remainder of the assembly and its construction may conform to that shown in Figures 3 and 4 and a further description thereof is believed to be unnecessary.

The construction shown in Figure 5 has a particular advantage that an image producing beam, having a relatively large cross-sectional area and adapted to produce brighter images, may be generated without correspondingly degrading the horizontal resolution of the beam which is established by the width dimension of the aperture 170. As a rule, it is desirable to limit the longitudinal dimension of the aperture 170 so that the beam produced thereby has a height approximately equal to or less than the spacing between consecutive horizontal scanning lines of the image raster, thereby to avoid reducing the vertical resolution of the image beam.

While I have described my invention by means of specific examples and in specific embodiments, I do not wish to be limited thereto for obvious modifications will occur to those skilled in the art without departing from the spirit and scope of the invention.

What I claim is:

1. A cathode-ray tube system comprising a cathode-ray tube having an electron beam intercepting member and means for generating a plurality of electron beams, said beam intercepting member having first portions thereof arranged in a given geometric configuration and having a first given response characteristic upon electron impingement, said intercepting member further having second portions thereof successively arranged in a second geometric configuration indicative of said first configuration and having a second given response characteristic upon electron impingement different from said first characteristic, said beam generating means comprising means for producing a first beam at a given point of effective origin, means for producing second and third beams at given points of effective origin symmetrically arranged with respect to the point of effective origin of said first beam and means for controlling the intensity of said first beam independently of the intensities of the others of said beams, means for scanning said beams in synchronism across said beam intercepting member thereby to energize said first portions and to energize said second portions in succession, means for applying to said intensity control means a signal quantity having variations indicative of desired variations of the response of said first portions, said second beam, by reason of the scanning thereof over said successive second portions, producing a first signal component having phase variations determined by displacements of the relative positions of the points of impingement of said first and second beams on said beam intercepting member, said third beam, by reason of the scanning thereof over said successive second portions, producing a second signal component having phase variations determined by displacements of the relative positions of the points of impingement of said first and third beams on said beam intercepting member, and means for deriving said signal components from said beam intercepting structure and for combining the same thereby to produce a control quantity having a phase substantially independent of displacements of the points of impingement of said second and third beams relative to the point of impingement of said first beam.

2. A cathode-ray tube system as claimed in claim 1 further comprising means responsive to said control quantity for controlling the relationship between the phase of said signal quantity and the position of said first beam on said beam intercepting member.

3. A cathode-ray tube system as claimed in claim 1 wherein said beam generating means comprises means for controlling the intensities of said second and third beams, and further comprising means for applying simultaneously to said intensity control means of said second and third beams a second signal quantity indicative of desired variations of the response of said second portions.

4. A cathode-ray tube system as claimed in claim 3 comprising means for deriving from said second portions a control quantity having variations as determined by the rate of scanning said second and third beams over said second portions and by the intensity variations of said second and third beams.

5. A cathode-ray tube system comprising a cathode-ray tube having an electron beam intercepting member and means for generating a plurality of electron beams, said beam intercepting member comprising consecutively arranged first portions each comprising a plurality of stripes of fluorescent material, said stripes producing light of different colors in response to electron impingement, said beam intercepting structure further comprising second portions spaced apart and arranged substantially parallel to said first stripes in a geometric configuration indicative of the position of said color stripes and comprising a material having a given response upon electron impingement different from the response of said first portions, said beam generating means comprising means for producing a first beam at a given point of effective origin, means for producing second and third beams at given points of effective origin symmetrically arranged with respect to the point of effective origin of said first beam and means for varying the intensity of said first beam independently of the intensities of said second and third beams, means for scanning said beams in synchronism across said beam intercepting member thereby to energize said first portions and to energize said second portions in succession, means for applying to said intensity control means a signal quantity having variations indicative of desired variations of the response to said light producing stripes, said second beam, by reason of the scanning thereof across said second portions in succession, producing a first signal component having phase variations determined by displacements of the relative positions of the points of impingement of said first and second beams on said beam intercepting member, said third beam, by reason of the scanning thereof across said second portions in succession, producing a second signal component having phase variations determined by displacements of the relative positions of the points of impingement of said first and third beams on said beam intercepting member, means for deriving said signal components from said beam intercepting structure and for combining the same thereby to produce a resultant control signal having a phase substantially independent of displacements of the points of impingement of said second and third beams relative to the point of impingement of said first beam, and means responsive to said resultant control signal for controlling the relationship between the intensity variations of said first beam and the position of said first beam on the said beam intercepting member.

6. A cathode-ray tube system as claimed in claim 5 further comprising means for cyclically varying the intensities of said second and third beams simultaneously at the same rate and in the same phase relationship, wherein said first control signal component has variations as determined by the cyclic intensity variations of said second beam and by the rate of scanning said second portions, and wherein said second control signal component has variations as determined by the cyclic intensity variations of said third beam and by the rate of scanning said second portions.

7. A cathode-ray tube system as claimed in claim 5 wherein said means responsive to said resultant control signal comprises means for controlling the phase of the signal quantity applied to said intensity control means.

8. An electron gun for a cathode ray tube comprising a cathode member having an electron emissive material deposited thereupon, first and second co-planar intensity control electrodes spaced from one another and arranged in cooperative relationship with said emissive material, and a third intensity control electrode disposed in the space between said first and second control electrodes and co-planar therewith, each of said electrodes being provided with an aperture through which an electron beam passes, the apertures of said first and second electrodes being positioned symmetrically with respect to the aperture of said electrode.

9. An electron gun according to claim 8 wherein said first, second and third electrodes are each provided with a circular aperture and wherein said apertures are collinear.

10. An electron gun according to claim 8 wherein said first and second electrodes are each provided with a circular aperture and wherein said third electrode is provided with a non-circular aperture.

11. An electron gun according to claim 10 wherein said third electrode is provided with a rectangular aperture having its larger dimension substantially perpendicular to a line passing through the apertures of said first and second electrodes.

12. A cathode ray tube system comprising a cathode ray tube having an electron beam intercepting member and means for generating a plurality of electron beams, said beam intercepting member having first portions thereof arranged in a first geometric configuration and having a first given response characteristic to the impingement of electrons thereupon, said intercepting member further having second portions thereof successively arranged in a second geometric configuration indicative of said first configuration and having a second given response characteristic to the impingement of electrons thereupon which is different from said first characteristic, said beam generating means comprising means for producing a first beam at a given point of effective origin, means for producing second and third beams at given points of effective origin spaced from the point of effective origin of said first beam, means for controlling the intensity of said first beam independently of the intensities of the others of said beams, means for scanning said beams in synchronism across said beam intercepting member, means for applying to said intensity control means a signal having variations indicative of desired variations of the response of said first portion, said second beam producing a first signal component having phase variations determined by displacements of the relative positions of the points of impingement of said first and second beams on said beam intercepting member, said third beam producing a second signal component having phase variations determined by displacements of the relative positions of the points of impingement of said first and third beams on said beam intercepting member, and means for deriving said signal components from said beam intercepting structure and for combining the same thereby to produce a control signal having a phase substantially independent of displacements of the points of impingement of said second and third beams relative to the point of impingement of said first beam.

13. In a cathode ray tube system, an electron intercepting member having first and second portions which exhibit respectively different characteristics in response to the impingement of electrons thereupon, means for directing electrons toward said member so that some of said electrons impinge on one area thereof and others impinge on another area thereof simultaneously, means for causing said electrons to scan said member, the position of one of said areas being subject, during said scanning, to variation relative to that of the other so that the responses of said member to electrons impingement at said respective areas varies accordingly, and means for deriving indications of said variations in relative position by detecting said corresponding variations in responses.

14. In a cathode ray tube system, an electron intercepting member having first and second portions which exhibit respectively different characteristics in response to the impingement of electrons thereupon, means for causing a plurality of beams to impinge on respectively different areas of said member, means for scanning said beams in unison over said member, the position of one of said areas being subject, during said scanning, to variations relative to that of another of said areas so that the responses of said member at said two areas to the electrons impingement thereupon varies accordingly, and means for deriving indications of said variations in relative positions by detecting said corresponding variations in responses.

15. A cathode ray tube system comprising a cathode ray tube having an electron intercepting member, said intercepting member including an image-forming portion and indexing elements, first, second and third means for producing first, second and third electron beams which impinge on first, second and third areas respectively of said intercepting member, said first and third beam producing means being symmetrically arranged with respect to said second beam producing means, means for causing said beams to scan said member in a plurality of paths extending generally in a first direction, said first and third areas being separated from said second area by substantially equal and varying distances measured in a direction transverse to said elements during the scanning of said member, means for modulating only the intensity of said second beam by image-representative signals thereby to cause said image-forming portion to reproduce an image in response to the scanning of said second beam thereupon, and means for deriving from the impingement of said first and third electron beams at said first and third areas on said indexing elements indications of said variations in distance between them.

16. The combination according to claim 13 wherein the position of said one area is subject, during said scanning, to variation as measured transverse to said first and second portions.

References Cited in the file of this patent

UNITED STATES PATENTS

| | | |
|---|---|---|
| 2,141,415 | Schlesinger | Dec. 27, 1938 |
| 2,165,028 | Blumlein | July 4, 1939 |
| 2,177,366 | Iams | Oct. 24, 1939 |
| 2,490,812 | Huffmann | Dec. 13, 1949 |
| 2,593,261 | Buchanan | Apr. 15, 1952 |
| 2,587,074 | Sziklai | Feb. 26, 1952 |
| 2,614,235 | Forgue | Oct. 14, 1952 |
| 2,631,259 | Nicoll | Mar. 10, 1953 |

UNITED STATES PATENT OFFICE

CERTIFICATE OF CORRECTION

Patent No. 2,858,364 October 28, 1958

William E. Bradley

It is hereby certified that error appears in the printed specification of the above numbered patent requiring correction and that the said Letters Patent should read as corrected below.

Column 2, line 23, for "strips" read -- stripes --; column 12, line 20, for "to said light" read -- of said light --; line 67, after "said" insert -- third --; column 13, line 53, for "impingement" read -- impingent --; column 14, line 13, for "impingement" read -- impingent --.

Signed and sealed this 18th day of August 1959.

(SEAL)
Attest:

KARL H. AXLINE
Attesting Officer

ROBERT C. WATSON
Commissioner of Patents